United States Patent [19]
Powell

[11] Patent Number: 6,129,371
[45] Date of Patent: Oct. 10, 2000

[54] DUAL LEVEL HITCH

[76] Inventor: Richard A. Powell, 5765 Spring Valley La., Dryden, Mich. 48428

[21] Appl. No.: 09/248,925

[22] Filed: Feb. 12, 1999

[51] Int. Cl.$^7$ ........................................................ B60R 9/00
[52] U.S. Cl. .................................... 280/461.1; 280/491.5; 224/521; 224/502
[58] Field of Search .............................. 280/461.1, 491.5, 280/495; 224/488, 495, 497, 502, 504, 505, 506, 519, 520, 521

[56] References Cited

U.S. PATENT DOCUMENTS

| | | |
|---|---|---|
| 4,089,448 | 5/1978 | Traeger . |
| 4,248,451 | 2/1981 | Usinger . |
| 4,280,713 | 7/1981 | Bruhn . |
| 4,640,658 | 2/1987 | Webb, Jr. . |
| 4,856,686 | 8/1989 | Workentine . |
| 5,330,084 | 7/1994 | Peters ........................................ 224/506 |
| 5,460,304 | 10/1995 | Porter et al. . |
| 5,647,521 | 7/1997 | Burgess ..................................... 224/534 |
| 5,649,656 | 7/1997 | Davy ......................................... 224/405 |
| 5,730,345 | 3/1998 | Yeckley et al. ........................... 224/505 |
| 5,732,866 | 3/1998 | Janek . |
| 5,775,560 | 7/1998 | Zahn et al. ................................ 224/524 |
| 6,039,227 | 3/2000 | Stark ......................................... 224/521 |

*Primary Examiner*—Kevin Hurley
*Attorney, Agent, or Firm*—Vanophem Meehan & Vanophem, P.C.

[57] ABSTRACT

A dual level hitch adapted to be connected to the front or rear of a vehicle. The hitch is provided with an upper and lower receiver adapted to receive either a ball mount or a platform for storing cargo. The upper and lower receivers are connected together utilizing a vertical extension bar. The vertical extension bar can be tilted in both the forward as well as the rearward direction to facilitate the opening and closing of a tailgate of the vehicle.

7 Claims, 3 Drawing Sheets

DUAL LEVEL HITCH

BACKGROUND OF THE INVENTION

1. Field of the Invention

The present invention relates generally to hitches connected to the rear or the front of a vehicle for the purpose of transporting various items of cargo external to the vehicle.

2. Description of the Prior Art

Various devices have been developed for attachment to automotive vehicles or utility vehicles for the purpose of allowing the vehicle to haul additional cargo or recreational equipment that could not readily be loaded into the interior of the vehicle. For example, U.S. Pat. No. 4,248,451 issued to Usinger describes a hitch assembly for use in interconnecting a conventional bumper 12 mounted on a towing vehicle to a tongue 16 of a towed vehicle. The embodiment illustrated with respect to FIG. 2 allows attachment of the bumper 12 located at a height somewhat greater than the height of the tongue 16. FIG. 3 shows a side elevation view in which the bumper height of the towing vehicle is generally the same as the height of the tongue of the towed vehicle. Finally, FIG. 4 illustrates an embodiment in which the bumper 12 of the towing vehicle is at a lesser height than the tongue 16 of the towed vehicle.

These three aforementioned situations are accommodated by the Usinger hitch assembly employing a first component 22 and a second component 24. The first component 22 is removably received within the second component 24 and includes an insertable portion 26 which is slidably positionable within a tubular portion 28 of the second component 24. The first component 22 is provided with a plurality of apertures 26c. The second component 24 is provided with a plurality of apertures 28c as well as openings 28a and 28b. The apertures 26a can be aligned with the apertures 28c by sliding the first element 22 to various positions within the second element 24. Pins 48, 50 are inserted through corresponding aligned apertures as shown in FIGS. 2, 3 and 4 to affix the relative positions of the first and second components 22, 24 respectively. An arm 38 is attached to the second component 24 close to the opening 28b. Based upon this configuration, when the first component 22 is inserted into the opening 28a, it would accommodate the situation in which the bumper 12 is at a greater height than the tongue 16. When the first component 22 is inserted into the opening 28b of the second component 24, this would accommodate the situation when the bumper 12 is generally at the same height as the tongue 16. Finally, when the first component 22 is inserted into the bottom of the second component 24 through the opening 28b, this would accommodate the situation in which the bumper 12 is at a height lower than the tongue 16.

U.S. Pat. No. 4,280,713 issued to Bruhn also describes a trailer hitch for connecting a towing vehicle to a towed vehicle. The hitch includes a first body member 12 having an integral mounting plate 14 attached thereto. The first body member 12 has a socket portion 18 that opens to the rear relative to the vehicle. The first body member 12 is releasably connected to a neck or bar 28 including a vertical body portion 30 with upper and lower oppositely standing projections 32 and 34. A second body member 42 includes a socket portion 44 opening toward the towing vehicle for receiving a projection 34 therein. The second body member 42 has upper and lower apertures 52 at its rearward end, each arranged to receive a hitch ball 54 in turn arranged for attachment to the socket portion of a trailer hitch. Similar to the Usinger patent, the Bruhn patent describes a trailer hitch for attaching a towed vehicle to a towing vehicle. Neither of these patents describe a device that would allow the transportation of various items of cargo external to the towing vehicle.

In certain instances, it would be more feasible to attach a carrier device directly to the rear of a towing vehicle provided with a platform or other support for supporting cargo, such as a bicycle or skiing equipment. Representative types of these devices are described in U.S. Pat. No. 4,089,448 issued to Traeger, U.S. Pat. No. 4,640,658 issued to Webb, Jr., and U.S. Pat. No. 4,856,686 issued to Workentine. For example, the patent to Traeger describes a rack mountable on the rear bumper of an automotive vehicle for carrying lightweight recreational vehicles, such as bicycles or skis. A vehicle carrying frame 10 is pivotally supported at one end by a pair of similarly constructed brackets 11. These brackets are mounted on the rear bumper of an automotive passenger vehicle. The frame includes a cross member 16 integral with telescopically connected cross members 14 and 15. A pair of bicycle hangers 17 protrude upwardly from the cross member 16. When the bicycles are secured, the frame can be tilted forwardly until extension members engage forward stops. At this time, the frame and the bicycles are generally parallel to the rear deck surface of the automobile with the frame spaced far enough above the deck surface that the handle bars and pedals extending through the frame do not touch the rear deck surface.

The patent to Webb, Jr. describes a mountable carrier for transverse attachment to the hitch tongue of a vehicle. The carrier includes a socket member 14 and a plug member 16. The plug member is L shaped allowing apertures in the socket member to be aligned with respect to apertures in the plug member. A releasable pin 50 is provided to retain the leg of the plug member within the socket member.

The patent to Workentine describes a cargo carrier mounted to a vehicle. The carrier includes an upright support 4 to which a bicycle carrier assembly 12 is mounted. A lower end 6 of the upright support 4 is connected to a collar 10 secured to a receiver insert 20 through the use of a positioning bolt 24. The bicycle carrier assembly 12 is provided with first and second pairs of arms 60, 62 extending in opposite radial directions at the ends 64, 66 of a bar 56. It is noted that this particular type of assembly along with the carriers described with respect to the patents to Traeger and Webb, Jr. are designed to transport a single type of cargo from a first destination to a second destination. However, they would be unable to be utilized if additional external cargo were also intended to be transported from the first destination to the second destination.

U.S. Pat. No. 5,460,304 issued to Porter et al. and U.S. Pat. No. 5,732,866 issued to Janek both describe vehicular carrier systems allowing a vehicle to simultaneously transport several distinct types of cargo external to the vehicle. As shown in various figures of the Porter et al. patent, two distinct types of cargo can be simultaneously transported. For example, as illustrated with respect to FIG. 4, a cargo carrier 16 is supported by a tubular support assembly 14. A bumper bar 74 having tubular ends 78 may be telescopically engaged with an open end 24 of the support assembly 14 as illustrated with respect to FIG. 2. If only the cargo carrier 16 were to be transported, the bumper bar 74 would be inserted into the support assembly 14 immediately behind the cargo carrier 16. However, as shown in FIG. 4, if the ski rack assembly 84 is also transported, the additional assembly as illustrated in FIG. 4 would be required. Various other arrangements of disparate cargo could also be transported as illustrated with respect to FIGS. 7 and 8.

Similarly, the patent to Janek describes a cargo carrier assembly adapted to transport a carrier assembly 20 as well as including an accessory rack 40 for the transport of additional material. As can be appreciated, while both the Porter et al. and Janek patents would allow a user to transport different types of cargo simultaneously, the type of hitch that would be utilized is rather complicated. Additionally, if the towing vehicle is provided with a tailgate, it would be difficult, if not impossible, to open the tailgate when the carrier system is in place.

SUMMARY OF THE INVENTION

The invention is a dual receiver hitch having a hitch extension with a second elevated receiver useable for any one of several functions. The elevated receiver can be used as a bicycle carrier, platform cargo carrier, cargo box, winch, etc. The lower receiver can also be adapted for the above stated functions as well as be used with a ball mount to pull an appropriately sized trailer. The extension feature allows for easy access to the rear hatch/tailgate of the vehicle in combination with its tilt feature.

Accordingly, it is an above of the present invention to develop a hitch extension including a first receiver to receive a first type of cargo and a second receiver to receive a second type of cargo.

It is yet another object of the present invention to provide a hitch provided with first and second receivers, each attachable to separate cargo supports.

It is another object of the present invention to provide a hitch extension provided with a first receiver for receiving a type of cargo and a second receiver attachable to a ball mount for use with an appropriate size trailer.

It is yet another object of the present invention to provide a hitch provided with first and second receivers, each attachable to separate cargo loads or supports, each of the receivers provided at a different height.

It is yet another object of the present invention to include a first extension bar to allow attachment to various types of vehicles, as well as a height adjustable second extension bar.

It is a further object of the present invention to provide a hitch including an upper hitch receiver that can be tilted, allowing easy access to the tailgate of the vehicle.

It is yet a further object of the present invention to provide a trailer hitch adapted to be used on either the front or the rear of the vehicle.

The present invention accomplishes these and additional objects by providing a dual level hitch provided with a lower horizontal extension bar adapted to be attached to the front or the rear of the vehicle. The lower horizontal extension bar is also provided with a receiver for use to attach a cargo support device or a ball mount. An adjustable vertical extension bar is attached to the lower horizontal extension bar by a device used to facilitate the tilting of the adjustable vertical extension bar. This device includes a plurality of radially arranged holes allowing the vertical extension bar to be supported at various angles with respect to the ground. An upper horizontal extension bar is attached to the vertical extension bar and includes a receiver for connection to a support for holding additional cargo.

The foregoing and additional objects and advantages of the present invention will be best understood by reference to the following detailed description of the present invention taken in conjunction with the appended drawings in which like reference numerals refer to like elements.

DETAILED DESCRIPTION OF THE PREFERRED EMBODIMENTS

Figure 1:
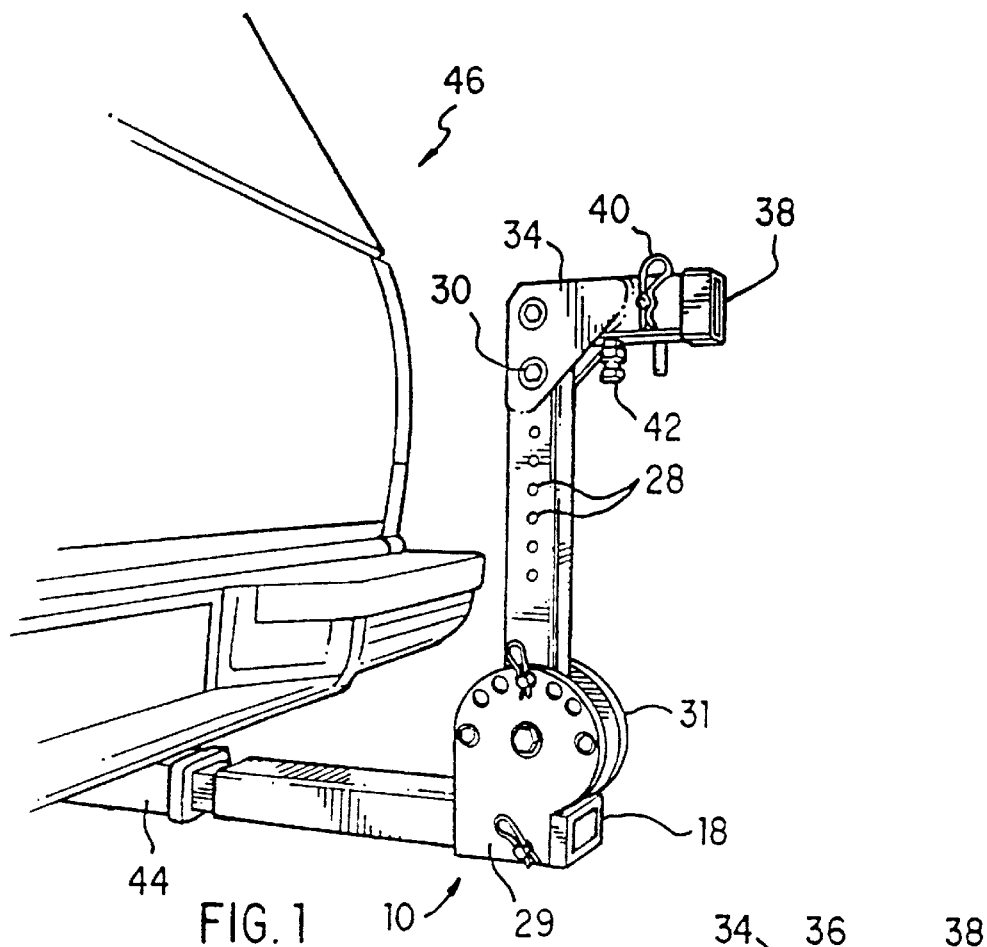
FIG. 1 is a perspective view of the dual level hitch attached to the rear of a vehicle.
Figure 2:
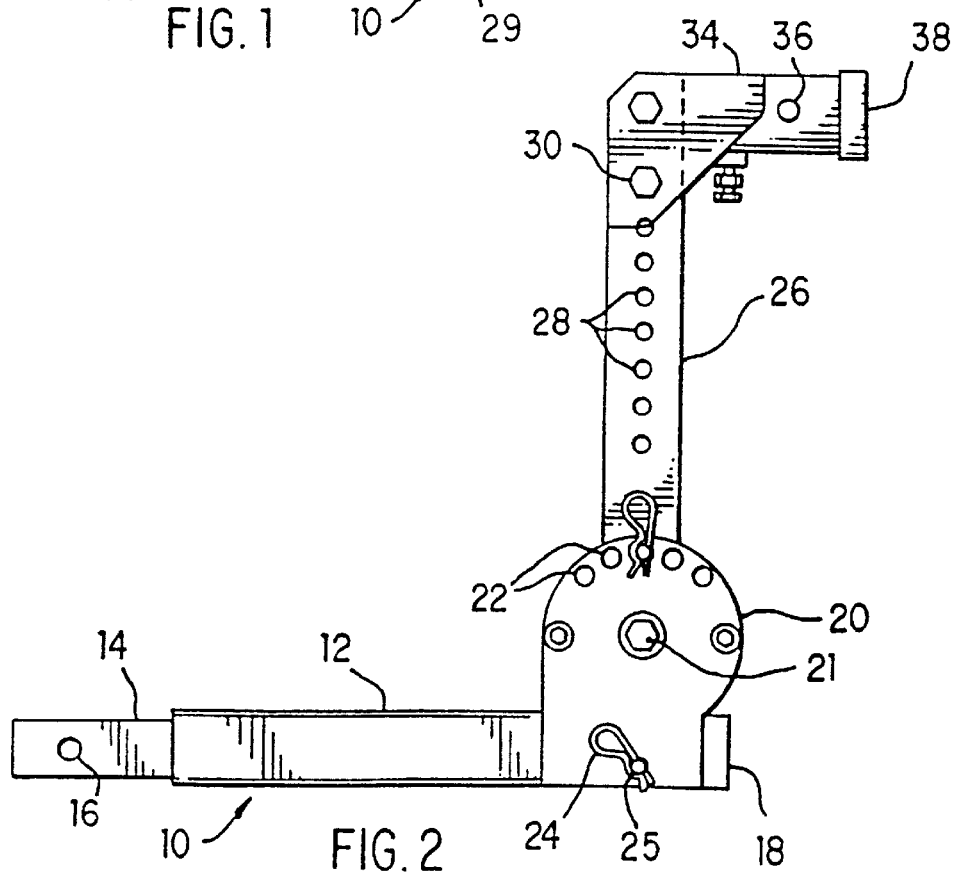
FIG. 2 is a side view of the dual level hitch.
Figure 4:
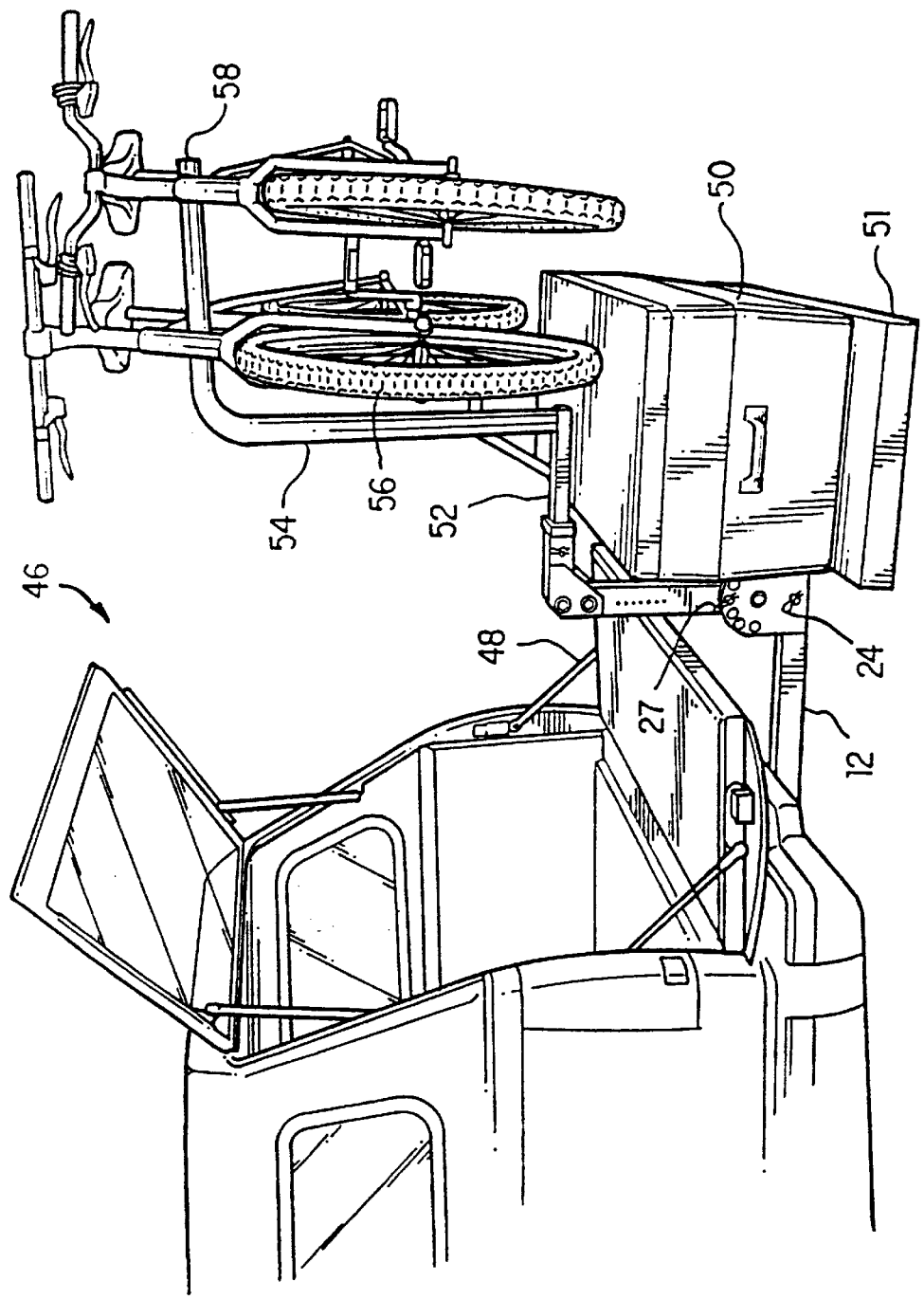
FIG. 4 is a perspective view of the present invention supporting various loads.

A dual level hitch 10 of the present invention is illustrated with respect to FIGS. 1, 2 and 4 in the upright vertical position. The dual level hitch 10 includes a first lower horizontal hitch extension bar 12, a vertical extension bar 26 as well as a second upper, horizontal extension bar 34. A tilting mechanism 20 including a plurality of radially aligned apertures 22 is used to join the first lower horizontal hitch extension bar 12 to the vertical extension bar 26. The first lower horizontal hitch extension bar 12 can be fixedly attached to the tilting mechanism 20 by, for example, welding both parts together (not shown) or can be removably attached to the tilting mechanism 20 through the use of appropriate fixture elements well known in the art. If the first lower horizontal hitch extension bar 12 is removably attached to the tilting mechanism 20, this would facilitate the use of lower horizontal hitch extension bars 12 of different lengths, thereby enabling the device to be used with differently sized vehicles.

The first lower horizontal hitch extension bar 12 has a cavity therein allowing a first end of the first lower horizontal hitch extension bar to be attached to a horizontal bar 14 which is in turn attached to a receiver device 44 provided on the rear frame or bumper of the vehicle 46 as shown in FIG. 1. Alternatively, it is noted that a first end of the horizontal bar 14 can be connected to a receiver device 44 provided on the front end of the vehicle. The horizontal bar 14 is also provided with an aperture 16 that would cooperate with a hitch pin or other device provided within the interior of the receiver device 44 to positively secure the horizontal bar 14 in place. The second end of the bar 12 is provided with a hollow receiver 18 that is used to attach a cargo support device or cargo load thereto. For example, as shown in FIG. 4, a storage box 50 can be attached to the receiver 18. A removable pin 24, such as a hitch pin, can be used to affix the storage box 50 to the receiver 18. Alternatively, the storage box 50 can be supported by a support device 51 onto which the storage box 50 is placed.

Figure 3:
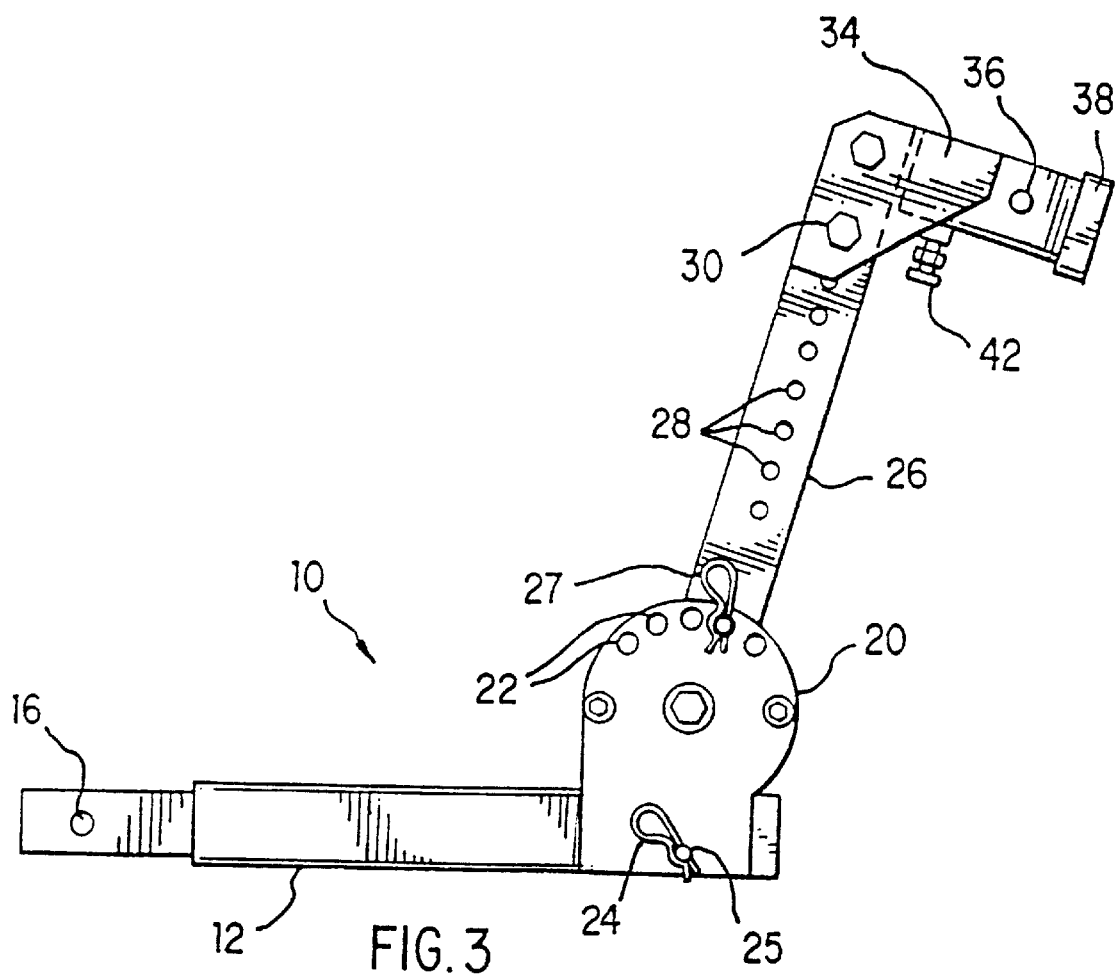
FIG. 3 is a side view of the present invention showing the dual level hitch in a tilting position.

As shown in FIG. 2, the first lower horizontal hitch extension bar 12 is provided with an aperture 25 for the accommodation of the hitch pin 24 or other device for securing the cargo box 50 or storage support 51 to the receiver 18. As illustrated in FIG. 1, the tilting mechanism 20 includes a first side member 29 and a second side member 31 allowing the vertical extension bar 26 to fit therebetween. Bolts or similar fastening devices are provided to fixedly secure the first side member 29 to the second side member 31. An axle 21 is used to secure the vertical extension bar 26 to the first and second side members of tilting mechanism 20. The axle 21 allows the vertical extension bar 26 to be tilted both in the rearward direction away from the vehicle, as shown in FIG. 3, as well as in a forward direction. The tilting mechanism 20 allows the vertical extension bar 26 to be rotated approximately 60° from the vertical in both the forward and rearward directions. However, it can be appreciated that the angle to which the vertical extension bar 26 can be rotated can also be greater or less than 60° from vertical. Once the vertical extension bar 26 is tilted to the proper angle as shown in FIG. 3, a hitch pin 27 or similar device is fitted through one of the plurality of apertures 22 of the first side member 29 of the tilting mechanism 20, through a hole in the vertical extension bar 26 and through one of a plurality of apertures (not shown) provided in the second side member 31. Since the tilting device allows the vertical extension bar 26 to be angled with respect to the horizontal, the plurality of apertures 22 of the first side member 29 as well as similar apertures in the second side member 31 are arranged in a mutually opposing circumferential pattern on the first and second side members 29 and 31.

The second upper horizontal extension bar 34 is secured to the vertical extension bar 26 through the use of two or more bolts or similar fastening device 30. The second upper horizontal extension bar 34 is provided with a hollow receiver 38 used to receive a second cargo support device or cargo load. As shown in FIG. 4, this second cargo support device could include a bicycle support device provided with a first horizontal bar 52 received in the hollow receiver 38, a vertical bar 54 connected to the first horizontal bar 52 and a second horizontal bar 58 connected to the vertical bar 54. In this embodiment, one or more bicycles 56 are supported by the second cargo support device.

The vertical extension bar 26 is provided with a plurality of vertically aligned apertures 28 thereby providing the feature of selectively altering the distance between the second upper extension bar 34 and the first lower horizontal hitch extension bar 12. Similar to the first lower horizontal hitch extension bar 12, the second upper extension bar 34 has a hollow cavity therein to allow the receiver 38 to receive a support platform. An aperture 36 is provided in the second upper horizontal extension bar 34 and is used in conjunction with a securing device, such as a hitch pin 40, to secure the upper storage load device to the receiver 38. The embodiment of the present invention, as shown in FIG. 4, illustrates the dual level hitch utilized with a utility vehicle provided with a movable tailgate 48. In this situation, the first lower horizontal hitch extension bar 12 is of a sufficient length to allow the tailgate 48 to be opened and closed while the hitch is supporting both the storage box 50 as well as the bicycles 56. However, in some situations, it would be prudent to employ a first lower horizontal hitch extension bar 12 of a lesser length. In this situation, the vertical extension bar 26 can be tilted, as shown in FIG. 3, to accommodate the opening and closing of the tailgate 48.

As illustrated with respect to FIG. 4, one embodiment of the present invention shows the first lower horizontal extension bar 12 connected to a utility vehicle, station wagon, or similar vehicle. The support device 51 is connected to the hollow receiver 18 for the purpose of supporting the storage box 50 thereon. Due to the length of the first lower horizontal hitch extension bar 12, the vertical extension bar 26 is in an upright position, still allowing the tailgate 48 of the vehicle to be lowered without engaging the vertical extension bar 26. The second upper horizontal extension bar 34 is connected to a bicycle carrier for supporting a pair of bicycles.

It is important to note that additional embodiments in which various cargo loads are supported at different levels as well as attached to various towing vehicles can also be accommodated. For example, the first lower horizontal hitch extension bar 12 in combination with a ball mount can be connected to a snow mobile or a jet ski trailer. Additionally, the support device 51 can be attached to the second upper horizontal extension bar 34 allowing the cargo box 50 to be supported at a higher level than is shown with respect to FIG. 4. In this instance, it would be possible to attach a second support device to the hollow receiver 18, thereby allowing a second cargo box to be attached thereto.

Alternatively, if the support device or platform 51 with the storage box 50 is attached to the second upper horizontal extension bar 34, a second lower support platform 51 can be attached to the receiver 18 for the purpose of affixing game, such as deer or moose, to the second lower support platform 51.

Additionally, if the support platform 51 with the storage box 50 is attached to the second upper horizontal extension bar 34, the first lower horizontal hitch extension bar 12 can be attached to a winch for a four-wheel rescue vehicle.

Another embodiment of the present invention would allow the support platform 51 to be attached to the first lower horizontal hitch extension bar 12 with the storage box 50 supported thereon. In this instance, the second upper horizontal extension bar 34 can be secured to a spare tire carrier. It can be appreciated that many other combinations of uses can be employed within the scope of the present invention.

The specific embodiments described and illustrated herein are obviously susceptible to modification in form or detail without departing from the spirit of the invention. For example, the two horizontal extension bars 12 and 34, as well as the vertical extension bar 26 and the tilting mechanism 20, can be constructed from steel, a steel based alloy, a lightweight metal alloy (such as aluminum) or a rugged plastic material. Additionally, the tilting mechanism 20 and the first lower horizontal hitch extension bar 12 including first and second side members 29 and 31 can be manufactured as one unit. In this situation, the vertical extension bar 26 will be attached to the first and second side members 29 and 31 by the axle 21, still allowing the vertical extension bar 26 to be rotated. Accordingly, the invention is not to be limited to all the illustrated embodiments disclosed but encompasses all modifications within the scope of the following claims.

What is claimed is:

1. A dual level hitch comprising:

a first lower horizontal bar provided with a first end adapted to be attached to the front end or the rear end of a vehicle and a second end provided with a receiver allowing a cargo load, cargo platform or a ball hitch to be attached thereto;

a support device attached to said first lower horizontal bar proximate to said second end of said first lower horizontal bar;

a vertical bar having an upper end and a lower end, said vertical bar attached to said support device at said lower end of said vertical bar; and a second upper horizontal bar attached to said upper end of said vertical bar, said second upper horizontal bar provided with a receiver allowing a cargo load or a cargo platform to be attached thereto.

2. The dual level hitch in accordance with claim 1, wherein the vertical distance between said first lower and second upper horizontal bars is adjustable.

3. The dual level hitch in accordance with claim 2, wherein said vertical bar has a plurality of vertically aligned holes, allowing said second upper horizontal bar to be attached to said vertical bar at different locations.

4. The dual level hitch in accordance with claim 1, wherein said support device is removably attached to said first lower horizontal bar.

5. The dual level hitch in accordance with claim 1, wherein said lower end of said vertical bar is attached to said support device by a movable axle.

6. The dual level hitch in accordance with claim 2, wherein said support device includes first and second side members, each side member provided with a plurality of radially arranged holes, and said vertical bar is provided with a hole proximate to its lower end, and further including a securement device passing through one of said radially arranged holes on each of said first and second side members and said hole provided on said lower end of said vertical bar, wherein said vertical bar can be secured to said support device at an angle with respect to horizontal of greater than 60° or less than 60°.

7. The dual level hitch in accordance with claim 1, further including a bar attached to said first end of said first lower horizontal bar and either the front end or rear end of the vehicle.

* * * * *